Aug. 28, 1956 J. E. KENNEDY 2,760,768
CAUSTIC LIME PRODUCING PLANT AND PROCESS
Filed May 26, 1953 2 Sheets-Sheet 1

INVENTOR
JOSEPH E. KENNEDY
BY
ATTORNEYS

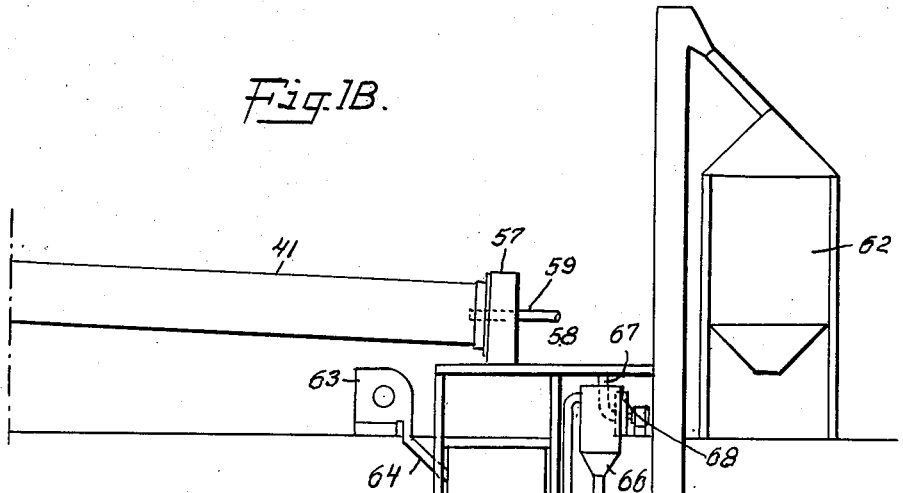
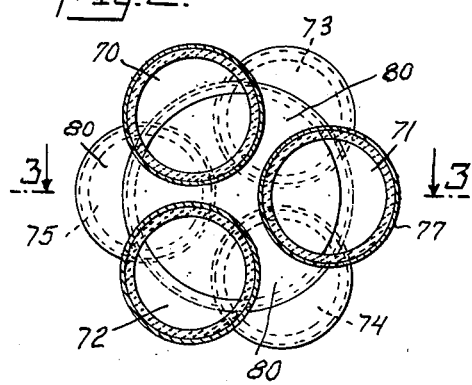
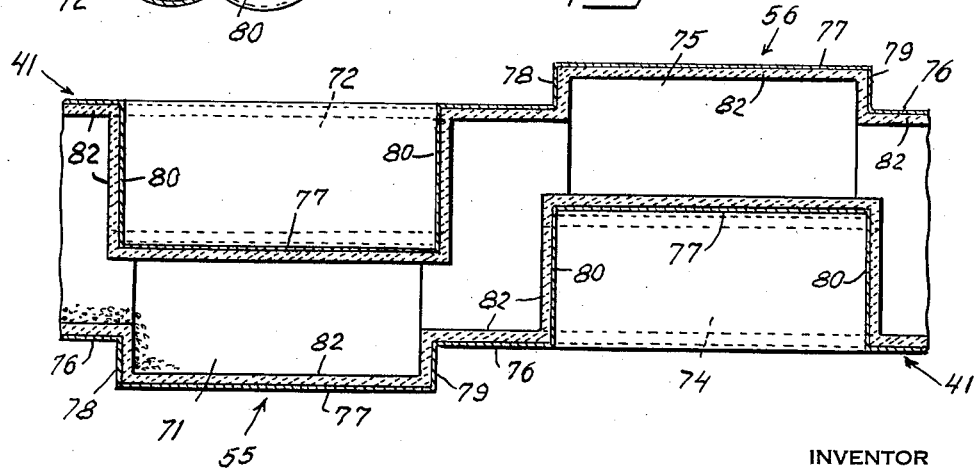

United States Patent Office 2,760,768
Patented Aug. 28, 1956

2,760,768

CAUSTIC LIME PRODUCING PLANT AND PROCESS

Joseph E. Kennedy, New York, N. Y.

Application May 26, 1953, Serial No. 357,465

12 Claims. (Cl. 263—32)

This invention relates to improvements in the manufacture of lime from limestone and in an improved rotary kiln for burning the limestone.

Lime is now produced by the burning of limestone in both rotary and vertical kilns. In the older processes, batches of limestone were burned in vertical kilns and later on it was discovered that a better quality of lime could be produced in rotary kilns but at a somewhat higher cost than that produced in vertical kilns. In the use of rotary kilns some improvements were introduced in order to lower the cost of production and as a consequence the rotary kilns became longer and longer until some of them reached a length of 400 feet or more.

These increases in length of the rotary lime kilns were made in order to reduce the temperature of the gases flowing therethrough, thereby reducing the overall fuel cost for effecting the calcining of the limestone. However, as the rotary kilns were increased in length certain disadvantages resulted, including the increase in the heat radiated through the lining and shell of the kiln. It was further found that even with such long kilns, the gases discharged therefrom were still at relatively high temperatures. Another disadvantage was the formation of slag rings in the kiln.

Therefore, the primary object of the present invention is to overcome the foregoing difficulties and to provide a plant of correlated elements and a process for the production of lime, including the use of a rotary kiln whereby the cost of production is greatly reduced over that previously obtained.

A further object of the invention is to provide an improved process for the manufacture of lime from limestone in which the heat developed in the kiln for burning the lime is conserved and utilized efficiently.

Another object of the invention is to provide an improved rotary kiln for burning limestone to lime, so designed that a relatively short kiln may be employed instead of the long rotary kilns previously used for the burning of limestone.

In accordance with the invention, the improved plant and procedure for producing lime from limestone comprises crushing means for crushing the limestone to a substantially uniform relatively small size, a conveyor for delivering the crushed limestone from the crusher to means for grading the crushed stone, such means delivering the crushed stone of proper size to a delivery bin from which it is conveyed to a rotary drier where excess moisture is removed. In this rotary drier the crushed limestone is moved countercurrent to a stream of hot gas which serves the dual purpose of drying the crushed limestone and removing limestone dust. The dried and crushed limestone is conveyed to a preheater, in which it is heated to a relatively high temperature by hot gases taken from the rotary kiln of the plant. Thereafter the preheated crushed limestone is delivered into the rotary kiln where it passes through a plurality of specially arranged heat exchange zones so that the crushed limestone to be burned is brought to an extremely high temperature before it enters the calcining zone of the rotary kiln. The calcined limestone is delivered from the firing end of the kiln into a heat exchanger and soaking pit where all elements of the burned and calcined limestone are stabilized and brought to a substantially uniform calcined condition. The burned limestone is cured or stabilized in the soaking pit and thereafter cooled by air contact.

In a preferred construction, the rotary kiln has a length of from only about 80 to 140 feet and will include in its integral structure two or more heat exchange sections, each comprising two or more steel tubes, preferably three, arranged in parallel and lined with fire brick. The rotary kiln including two or more of these heat exchange sections is set at an inclination of from ½ to ⅜ inch per foot, each heat exchange section providing a capacity for heating approximately three times the quantity which would normally be heated in the same length of the cylindrical portion of the kiln. Furthermore, the tubular heat exchangers arranged in parallel in each section are staggered with respect to corresponding tubular heat exchangers in adjacent sections. This arrangement provides for efficient utilization of the entire stream of hot gases flowing through the cylindrical part of the kiln, since in each heat exchange section the gases will flow through the tubes in parallel. Turbulence is also created in the kiln by the tubular heat exchangers, thereby increasing the heat transfer to the crushed limestone.

The improved process and apparatus of the present invention for producing lime from limestone includes other features and advantages described in detail hereinafter in connection with the accompanying drawings forming a part of this application.

In the drawings:

Figs. 1A and 1B when combined end to end constitute an elevational diagrammatic view of a lime plant incorporating the features of the present invention;

Fig. 2 is a sectional view through one of the heat exchanger sections of the rotary kiln taken on the line 2—2 of Fig. 1A;

Fig. 3 is a longitudinal sectional view taken through the tubular heat exchange sections of the rotary kiln shown in Fig. 1A, taken on the line 3—3 of Fig. 2.

Figure 1A:
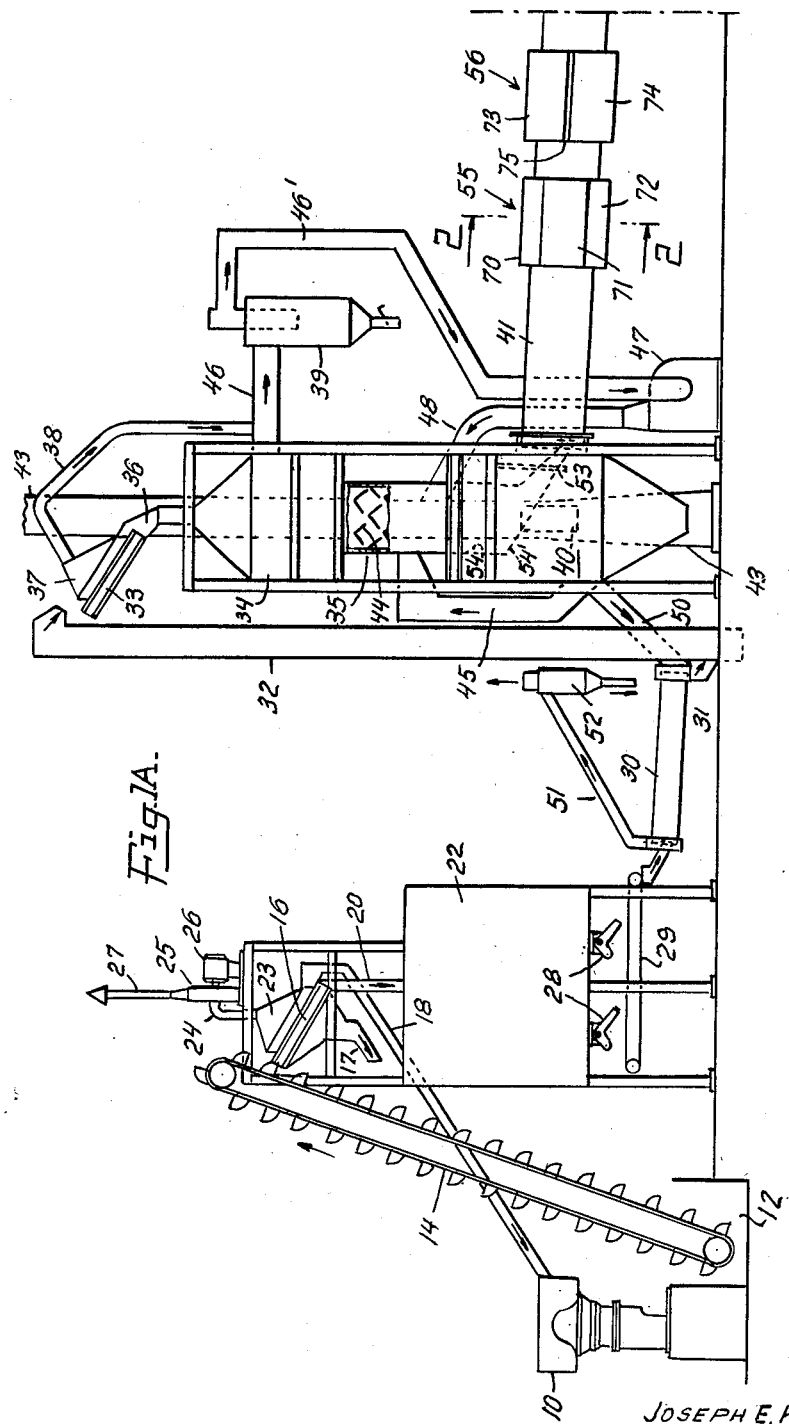

Referring to Figs. 1A and 1B of the drawings, the limestone as it comes from a quarry is delivered to a gyratory crusher 10, at the left in Fig. 1A, in which most of the limestone is crushed to the desired size for calcining, the crushed limestone being delivered into a receiving pit 12 from which it is picked up by a belt and bucket elevator 14 and discharged onto a slanting vibrating screen 16. The screen 16 has a selected mesh corresponding to the maximum size of limestone suitable for calcining, the fines being discharged through a chute 17 while the oversize is discharged from the vibrating screen 16 through a chute 18 back to the crusher 10 for recrushing. The crushed limestone of desired size range delivered through the vibrating screen passes through a chute 20 into a bin 22 for crushed stone.

In order to remove as much dust as possible at an early stage in the process, the vibrating screen 16 is covered with a hood 23 connected by an exhaust duct 24 to a blower 25 driven by a motor 26. The fan 25 draws air through the vibrating screen 16, picks up the dust, and delivers it through a discharge duct 27, it may discharge to atmosphere or to a cyclone separator for recovering the limestone dust.

The storage bin 22 for crushed limestone has a considerable capacity and is provided with a plurality of bin gates 28, which when lowered will deliver crushed stone at the rate desired onto a belt conveyor 29, which delivers the crushed stone through a chute into a rotary drier 30. This drier as well as most of the elements shown in Figs. 1A and 1B are shown diagrammatically but this drier may be 20 to 30 feet long and rotated in the usual manner such that the stone delivered therethrough is dried of all excess water and moisture, the resulting dried limestone being delivered through a closed chute 31 into the bottom of an enclosed bucket elevator 32 from which the crushed stone is discharged from the top onto a vibrating screen 33. The vibrating screen is arranged over a stone bin 34 located directly above a vertically arranged preheater 35. The vibrating screen 33 is designed to remove any further quantities of fine limestone, by means like that for the screen 16, while the limestone running off the screen 33 enters the bin 34 through a chute 36. Air is drawn through the screen 33 into a hood 37 and conducted away through a duct 38 into a cyclone separator 39 for the separation of dust.

The bin 34 and preheater 35 comprise a part of the tower structure supported by frame members as shown, which also houses a receiving chamber 40 for hot gases discharged from the feed end of a rotary kiln 41, the receiving chamber 40 being connected by a laterally-extending and damper-controlled duct 42 with a stack 43. The outside of the heat exchanger 35 is preferably constructed of brick while the inside comprise an overlapping series of horizontal angle iron plates 44 over which the crushed stone flows while it is being preheated with hot gases drawn into the lower portion of the preheater from the chamber 40 through a duct 45. The hot gases pass along under the plates 44 and upwardly through the crushed limestone flowing thereover. At the top of the preheater the hot gases are withdrawn through a duct 46 into the cyclone separator 39. The upper outlet portion of the cyclone separator 39 is connected by a suction duct 46' with the inlet of a blower 47, which discharges through a duct 48 into the stack 43. The dust collected in the cyclone separator 39 is withdrawn therefrom at the bottom. The air and dust drawn through the duct 38 from the hood 37 by the suction applied to the separator 39 is delivered into this separator.

A portion of the hot gases in the receiving chamber 40 are utilized for drying the crushed limestone in the rotary conveyor and drier 30, such gases being delivered through a duct 50 into the discharge end of the drier 30 so that the gases pass countercurrent to the flow of crushed stone therethrough. The ends of the drier 30 are closed so that the moist gases and dust collected by the gases in the rotary drier 30 are conducted through a duct 51 into a cyclone separator 52 in which the dust is separated from the gases. The gases may be discharged directly from the separator 52 into the atmosphere, but are preferably drawn by a blower through a duct, not shown, and delivered into the stack 43.

The hot gases delivered by the rotary kiln 41 into the receiving chamber 40 flow against a baffle plate 53 and are deflected downwardly in the chamber so that most of the dust therein is collected in the lower funnel-shaped bottom of the chamber for removal.

The lower portion of the preheater 35 is connected into a hopper 54 and an inclined chute 54' leading therefrom and terminating inside the feed end of the kiln 41. A known type of feeding means, not shown, is located above the hopper 54 at the bottom of the heat exchanger 35 for feeding the preheated limestone into the hopper and kiln at a predetermined rate. As the kiln 41 rotates, the limestone advances therethrough in heat exchange with the high temperature gases produced at the outlet end of the kiln. In this operation, the limestone advances through a pair of heat exchange sections 55 and 56 comprising a plurality of short parallel tubes or cylindrical chambers which form an integral part of the kiln, these chambers having the structure shown in Figs. 2 and 3. During the rotation of the kiln, crushed limestone from the feed end is fed into the tubular chambers of the heat exchange section 55 as these chambers respectively approach the bottom in their rotation cycle. The same operation takes place with respect to the section 56.

The limestone advancing through the lower portion of the kiln 41 is calcined at very high temperatures and delivered into a stationary hood 57 mounted on a preheater 58 so that the calcined limestone falls directly into the preheater. The heat for effecting the calcining of the limestone is provided by the flame from a burner tube 59 extending through the hood 57 into the end of the kiln 41, pulverized coal or oil or gas is delivered in a stream of hot air through the burner tube 59, while the necessary secondary air for combustion is delivered around this tube in the usual manner.

The calcined or burned limestone or lime is delivered to the heat exchanger 58 at a temperature approximating 2200° F. and a considerable body of the lime is maintained in the upper part of the preheater so that the entire mass is premitted to soak and come to a uniform temperature even though there may be slight variations in the temperature of the different portions of the lime delivered by the kiln. In reaching a uniform temperature, the lime assumes a substantially uniform composition and degree of burning or calcining. The heat exchanger 58 preferably has a capacity sufficient to permit all parts of the burned limestone to remain therein from two to three hours.

The heat exchanger 58 is made of brick-work and includes alternately arranged angle iron baffle plates of the type shown in the preheater 35, and the lower part of the preheater includes a known type of feeding mechanism, such as a pusher, not shown, for discharging the lime at the required rate, the resulting discharged lime falling onto a metal conveyor belt 60 which delivers the cooled lime into the lower end of a bucket elevator 61 which delivers the lime into a storage bin 62.

The cooling of the burned limestone in the heat exchanger 58 is effected by means of air delivered by a blower 63 through a duct 64 into one side of the heat exchanger. The air flows through the lower part of the heat exchanger around the baffles therein and through the lime. The hot air is discharged from the heat exchanger through a duct 65 and conducted along with any lime dust into a cyclone separator 66. The air outlet 67 of the cyclone separator is connected into a blower 68 which applies suction in the separator 66, the duct 65 and the heat exchanger 58. The hot air from the separator 66 is advantageously delivered to the burner tube 59 along with the pulverized coal or oil or gas supplied thereto. The dust separated out in the separator 66 is collected in a duct 69 and discharged at intervals, by means of a pair of valves therein, onto the belt conveyor 60 for delivery along with the lime thereon into the elevator 61 and bin 62.

The kiln 41 as well as other elements of the apparatus is shown diagrammatically in Figs. 1A and 1B, and it is to be understood that the kiln 41 and rotary drier 30 are provided with suitable supporting rings and rollers and means for effecting their rotation in accordance with conventional practice.

The heat exchange sections 55 and 56 of the rotary kiln, as shown in detail in Figs. 2 and 3, each includes three cylindrical tubes or chambers, the section 55 including regularly-spaced chambers 70, 71 and 72, while the section 56 includes chambers 73, 74 and 75. The main body of the rotary kiln 41 includes a steel shell 76 while each of the chambers 70 to 75 is provided with a steel shell 77 connected by steel arcuate or quarter-moon-shaped end segments 78 and 79 with the shell 76. The respective ends of the chambers of each heat exchange section are also respectively connected to scalloped or trifoil-like end plates 80 having a diameter equal to that of the shell 76 and attached thereto. Each end plate is formed by cutting out arcuate segments, the axes of which are 120° apart, having the diameter of the shells 77, the end plates 80 being welded or otherwise attached to the ends of the shells 77 in the same planes as the respective segments 78 and 79.

In the construction shown in Figs. 2 and 3, the shells 77 of the chambers 70 to 75 have a diameter somewhat greater than half the diameter of the shell 76 and the inner peripheries of the shells 77 are spaced somewhat away from the axis of the shell 76 so that the outer portions of the peripheries of the shells 77 project beyond the arc of the shell 76 to the extent of the arcuate segments 78 and 79, which are provided for each shell and which are welded or otherwise fixed to the respective shells 77 and the shell 76.

The shell 76 is lined with fire brick 82 in the usual manner and the same is true of the shells 77 and the end plates 80 and segments 78 and 79 associated therewith. The heat exchange sections 55 and 56 in spaced relation are preferably located near the feed end of the kiln 41. Two more of these sections may be employed, separated by a short section of the shell 76, as shown.

During the rotation of the kiln, the chambers of each section alternately receive preheated limestone from the feed end portion of the kiln as they respectively pass through the lower portion of their cycle. In this operation, the limestone pours into the heat exchange chamber over the fire brick covering the arcuate end segment 78, as shown at the lower left in Fig. 3. Each of the tubes 70 to 75 discharges a part of its load of limestone as it moves toward and through the upper portion of its cycle of rotation, the discharged stone falling across the ends of the other chambers of the particular section through the hot gases flowing thereto.

The tubes of the heat exchange section 55 are staggered, at an angle of 60° with respect to the tubes of the heat exchange section 56 so that the hot gases passing through the tubes of the heat exchange section 56 flow directly against the scalloped end wall in front of the plate 80 of the section 55 and are deflected and agitated in the intervening portion of the shell 76 before they flow through the tubes of the heat exchange section 55. Turbulence is further created in both heat exchange sections because of the offsets formed by the arcuate segments 78 and 79. The stream of hot gases moving through the lower portion of the kiln is also agitated and broken up before it enters the first heat exchange section 56, by the trifoil-like wall in front of the end plate 80.

In the operation of the apparatus and plant of the present invention, the crushed limestone is delivered to the kiln 41 at a very high temperature, as for example, at a white or bright red heat. This feature coupled with the use of the heat exchange sections 55 and 56 brings the crushed limestone to a calcining condition soon after it leaves the heat exchange section 56. Since the heat exchange sections carry considerable loads of limestone and greatly increase the heat exchange, it is possible to use a kiln of greatly reduced length compared to that which would normally be necessary. For example, it is possible to produce excellent lime with a rotary kiln of from 80 to 100 feet in length, although in some instances kilns of 140 to 150 feet in length may be employed. The heat exchange sections are preferably relatively short and not more than 10 to about 15 feet in length.

Considerable advantage is derived from the use of two or more sections where the tubes of the respective sections are angularly offset with respect to the other, as shown in Figs. 2 and 3 of the drawings. Furthermore, the tubes should be of a size so that the end plates 80 are of ample strength and area for producing turbulence and such that the arcuate end plates, or walls inside the end plates 78 and 79 have a sufficient area to retain considerable quantities of crushed limestone and to increase the turbulence of the hot gases flowing through the kiln.

In carrying out the improved process for producing a high grade of lime, it has been found that the crushing of the limestone to substantially uniform size is an important factor. Furthermore, the removal of dust and moisture prior to the delivery of the crushed limestone to the preheater 35 greatly contributes to the efficiency and successful operation of the process. The drying of the limestone in the rotary drier 30 absorbs considerable heat but this separate drying operation distinct from that of the heating operation conducted in the preheater 35 greatly contributes to the efficiency of the process, since it avoids the presence of any slimy material produced from dust, in the heat exchanger 35. The removal of moisture in the rotary drier 30 also eliminates a considerable part of the dust and provides a dry crushed limestone which is more effectively screened and graded by the vibrating screen 33 than otherwise would be possible.

In the burning of limestone in the rotary kiln 41, there is of necessity a considerable production of dust both from the limestone and from the ash of the powdered coal if powdered coal is employed as a fuel. The provision of the baffle 53 greatly facilitates the separation of this dust in the chamber 40, thereby preventing excessive contamination of the limestone in the preheater 35.

The process of the present invention is adapted to produce lime of specially high grade and at a throughput which makes the production economical and profitable.

What I claim is:

1. A process for manufacturing lime from limestone, in which crushed limestone is burned in a substantially horizontal rotary kiln, characterized by crushing limestone and thereby producing crushed limestone of a desired size for burning in the kiln, removing dust from the crushed limestone, conveying the crushed limestone into a drying zone and therein drying the crushed limestone in contact with hot gases from the rotary kiln, passing said hot gases through the drying zone to remove dust from the crushed limestone, conducting the dried crushed limestone from the drying zone to a screening zone and removing fines and dust, conducting the dry crushed limestone free of fines and dust into a preheating zone and therein preheating the dried crushed limestone to a relatively high temperature by contacting therewith substantially dust-free high temperature gases from the rotary kiln, feeding the preheated crushed limestone substantially free of dust into the feed end of the rotary kiln and therein advancing a stream of the crushed limestone gradually through the kiln countercurrent to high temperature combustion gases, completing the calcining of the crushed limestone in the discharge end portion of the rotary kiln, and discharging the calcined limestone from the discharge end of the kiln.

2. A process according to claim 1 characterized in that the hot gases in the rotary drier are passed therethrough countercurrent to the passage of crushed limestone to pick up dust, discharging the dust and moisture laden gases from the drier and separating the dust therefrom.

3. A process according to claim 1, characterized in that the initially produced crushed limestone is subjected to a grading operation in which the dust, fines, and oversize crushed limestone are separated from the crushed limestone of desired size, and recrushing the oversize limestone.

4. A process according to claim 1, characterized in that the dried crushed limestone delivered from the rotary drier is subjected to a grading operation for the removal of dust and fines prior to being conducted into the preheater.

5. A process according to claim 1, characterized in that the high temperature gases produced in the rotary kiln are discharged therefrom at the feed end of the kiln into an enlarged dust separating zone, directing the gases to the lower portion of the dust separating zone for the separation of dust, and conducting portions of the substantially dust free hot high temperature gases respectively to the rotary drier and to the preheater.

6. A process according to claim 1, characterized in that the calcined limestone conducted from the discharge end of the rotary kiln is delivered into a soaking and heat exchange zone in which the body of the calcined limestone is maintained at a high temperature for a considerable period of time for stabilizing the calcined limestone and bringing the various portions making up the body to a substantially uniform consistency.

7. An apparatus for producing lime from crushed limestone, characterized by including a rotary kiln for calcining the crushed limestone, means for crushing limestone to produce crushed limestone of desired size for calcining, means for grading the crushed limestone to eliminate dust, fines, and oversize crushed limestone none of which are sent to the kiln, means for conducting the crushed limestone of desired size into a storage bin, a conveyor, means for delivering crushed limestone from the storage bin onto the conveyor, a rotary drier, means for delivering crushed limestone from said conveyor into the rotary drier, a heat exchanger, means for delivering dried crushed limestone from the rotary drier into the preheater, means for heating the crushed limestone in the preheater with high temperature gases from the rotary kiln, and means for delivering preheated crushed limestone from the preheater into the rotary kiln for calcining therein.

8. An apparatus according to claim 7, characterized by an enlarged chamber at the feed end of the rotary kiln for receiving hot gases therefrom, a deflector plate located in said enlarged chamber spaced from the feed end of the kiln for deflecting gases from the kiln downwardly in said chamber for the separation of dust therefrom, and means for conducting hot gases substantially free of dust from the said enlarged chamber respectively to the rotary drier and to the preheater for crushed limestone.

9. An apparatus according to claim 8, characterized by means for applying suction to and for drawing air through the crushed limestone being delivered to the preheater for removal of dust therefrom.

10. An apparatus according to claim 7, characterized in that the rotary kiln comprises a plurality of axially aligned enlarged cylindrical sections separated by a plurality of spaced heat exchange sections alternating respectively with enlarged cylindrical sections and connected thereto, each heat exchange section including a plurality of parallel cylindrical chambers the opposite ends of which are connected respectively into the facing ends of two adjacent sections of said enlarged cylindrical sections, the axes of the chambers of one heat exchange section being offset with respect to the axes of an adjacent heat exchange section, and means for connecting the chambers of said heat exchange sections with the respective adjacent sections of said enlarged cylindrical sections of the kiln to form a rigid structure.

11. An apparatus for producing lime from crushed limestone, characterized by means for crushing limestone to produce crushed limestone of desired size for calcining, means for grading the crushed limestone to select the crushed limestone of desired size, a storage bin, means for conducting the selected crushed limestone into said storage bin, a rotary cylindrical drier, means for conducting crushed limestone from the bin to the drier, a preheater, means for delivering dried crushed limestone from the rotary drier to the preheater, means for removing fines and dust from the crushed limestone being delivered from the rotary drier to the preheater, a rotary kiln, and means for delivering crushed limestone free of dust and fines into the rotary kiln.

12. A rotary kiln for calcining crushed limestone to produce lime, characterized by a plurality of axially aligned enlarged cylindrical sections comprising the main body of the kiln, said sections being separated in spaced relation by and alternating with heat exchange sections each including a plurality of similar parallel cylindrical chambers, the opposite ends of said chambers being connected respectively into the facing ends of adjacent enlarged cylindrical sections, said parallel cylindrical chambers being individual tubular structures each including a cylindrical steel shell and a refractory brick lining, said parallel cylindrical chambers being parallel to the axis of said enlarged cylindrical sections and located outside said axis with their ends opening directly into the respective ends of adjacent enlarged cylindrical sections to which said parallel cylindrical chambers are connected, the axes of the cylindrical chambers of each heat exchange section being offset angularly with respect to the axes of the cylindrical chambers of the next adjacent heat exchange section, and means for connecting said parallel cylindrical chambers with the respective adjacent ends of said enlarged cylindrical sections of the kiln to form a rigid closed structure.

References Cited in the file of this patent

UNITED STATES PATENTS

| 72,843 | Goodman | Dec. 31, 1867 |
| 1,605,279 | Pike | Nov. 2, 1926 |
| 1,885,845 | Lindhard | Nov. 1, 1932 |
| 1,916,417 | Coulson | July 4, 1933 |
| 2,125,263 | Ahlmann | Aug. 2, 1938 |

FOREIGN PATENTS

| 447,191 | Germany | July 20, 1927 |